(12) United States Patent
Boucher

(10) Patent No.: US 7,501,993 B2
(45) Date of Patent: *Mar. 10, 2009

(54) ANTENNA ALIGNMENT SYSTEM AND METHOD

(76) Inventor: Christian Boucher, 2880 Cote St-Philippe Ouest, Mascouche, PQ (CA) J7K 3C3

( * ) Notice: Subject to any disclaimer, the term of this patent is extended or adjusted under 35 U.S.C. 154(b) by 3 days.

This patent is subject to a terminal disclaimer.

(21) Appl. No.: 11/675,971

(22) Filed: Feb. 16, 2007

(65) Prior Publication Data

US 2008/0001835 A1 Jan. 3, 2008

Related U.S. Application Data

(63) Continuation of application No. 11/056,118, filed on Feb. 14, 2005, now Pat. No. 7,180,471, which is a continuation-in-part of application No. 10/424,820, filed on Apr. 29, 2003, now Pat. No. 6,897,828.

(60) Provisional application No. 60/376,199, filed on Apr. 30, 2002.

(51) Int. Cl.
 *H01Q 1/12* (2006.01)
 *H01Q 3/00* (2006.01)
 *H01Q 9/34* (2006.01)
(52) U.S. Cl. .................. 343/890; 343/757; 343/874
(58) Field of Classification Search ................ 343/757, 343/874, 878, 880, 882, 890
See application file for complete search history.

(56) References Cited

U.S. PATENT DOCUMENTS

| 5,248,225 | A | 9/1993 | Rose |
| 5,551,797 | A | 9/1996 | Sanford |
| 5,836,115 | A | 11/1998 | Clay et al. |
| 6,023,242 | A | 2/2000 | Dixon |
| 6,243,649 | B1 | 6/2001 | Wetherbee et al. |
| 6,559,806 | B1 | 5/2003 | Watson |
| 6,690,917 | B2 | 2/2004 | Soliman et al. |
| 6,754,584 | B2 | 6/2004 | Pinto et al. |

(Continued)

FOREIGN PATENT DOCUMENTS

CA 2070792 1/1993

OTHER PUBLICATIONS

European Patent Application No. 06 705 140.9 Supplementary Search Report dated Oct. 1, 2008.

*Primary Examiner*—Shih-Chao Chen
(74) *Attorney, Agent, or Firm*—Curtis B. Behmann; Borden Ladner Gervais LLP

(57) ABSTRACT

A system and method of aligning an antenna with a predetermined azimuth direction. The method includes determining an antenna azimuth direction and moving the antenna from the antenna azimuth direction towards a predetermined azimuth direction so as to align said antenna. This is accomplished in response to processed positioning data received by a global positioning system (GPS) receiver from a GPS system where the receiver is locatable at predetermined first and second positions away from the antenna. The system includes at least two reference targets affixed to the antenna, a reference tool operatively coupled to the targets, and a GPS receiver connected to the reference tool. The receiver is in communication with a GPS system for processing positioning data received therefrom to determine an antenna azimuth direction of the antenna and thereby enable alignment of said antenna by moving the antenna with a predetermined azimuth direction.

18 Claims, 4 Drawing Sheets

U.S. PATENT DOCUMENTS 6,850,202 B2   2/2005   Watson
6,897,828 B2   5/2005   Boucher
7,180,471 B2 * 2/2007  Boucher .................... 343/890

* cited by examiner

ANTENNA ALIGNMENT SYSTEM AND METHOD

CROSS REFERENCE TO RELATED APPLICATIONS

This application is a continuation of U.S. patent application Ser. No. 11/056,118 filed on Aug. 30, 2002, which is a continuation-in-part of U.S. patent application Ser. No. 10/424,820 filed on Apr. 29, 2003, now issued as U.S. Pat. No. 6,897,828, which claims priority of U.S. Provisional Application Ser. No. 60/376,199, each of which are herein incorporated by reference.

FIELD OF THE INVENTION

The present invention concerns an antenna, more particularly to a method of aligning the antenna with a predetermined azimuth direction.

BACKGROUND OF THE INVENTION

Wireless communications are now commonplace and rely on telecommunication antennae to transmit information to wireless devices such as mobile telephones including cellular, PCS, GSM, TDMA, CDMA, and the like.

For maximum broadcast area coverage, the telecommunications antennae are located at high altitudes, such as on transmission towers and hi-rise buildings. The antennae must be aligned with a reference point, especially in azimuth (within a horizontal plane), with a considerable degree of precision for optimum broadcast and reception quality in addition to achieving a maximum broadcast range. Typically, for antenna alignment, surveyors are used to align the antenna using given coordinates and geodesic reference points, which are typically taken at ground level. Once this information is processed, an installation expert is required to ascend the structure and gradually align the antenna using an iterative process, using the coordinates furnished by the surveyors. After this adjusting procedure is complete, the installer bolts the antenna securely to its base and moves on to the next antenna.

While this procedure is relatively straightforward, it suffers from a number of significant disadvantages. On-site calculations require two highly trained people on the ground to gather pertinent information, which then must be processed and registered by the surveying company. This is often expensive, especially if multiple measurements are to be made. In addition, the procedure often requires hiring individuals with expertise in working at high altitudes, such as high steelworkers and wall scalers. Again, this can further increase the expense of aligning the antenna. Thus there is a need for an improved antenna alignment system.

SUMMARY OF THE INVENTION

It is therefore a general object of the present invention to provide an improved antenna alignment system and method.

The present invention reduces the difficulties and disadvantages of the aforesaid problems by providing a simple method of aligning an antenna with a remote emitter reference point using a global positioning satellite (GPS). Advantageously, the alignment method essentially eliminates the need for expensive and time-consuming iterative data processing by surveyors and dissemination of the data to antenna alignment personnel in the field. The present invention also eliminates the need for excessive alignment equipment at the antenna itself. In addition, the present antenna alignment method can be performed, in conditions of poor visibility, such as at night or in fog, rain, snow, or clouds when radio frequency (RF) emitters or the like are used. The method is inexpensive and simple to use and provides the user a reliable and accurate way of aligning the antenna. The novel method is typically accomplished by using two GPS receiver dishes and a GPS, which relay information to a user on-site to enable him to align the antenna with a predetermined azimuth direction. The predetermined azimuth direction represents the preferred direction for signal transmission to and/or from said antenna. A minimum of one receiver dish, in movable relationship relative to a reference tool, could be used to perform the antenna alignment. Moreover, the system is portable and uses one or more targets mounted adjacent the antenna for alignment thereof from the reference tool located remote from the antenna.

In a first aspect of the invention, the present invention includes a method of aligning an antenna with a predetermined azimuth direction, said method comprising: in response to processed positioning data received by a first global positioning system receiver dish from a global positioning satellite system where said first receiver dish is locatable at predetermined first and second positions away from said antenna, determining an antenna azimuth direction of said antenna; and moving said antenna from said antenna azimuth direction towards said predetermined azimuth direction so as to align said antenna.

In a second aspect of the invention, the present invention includes a system for alignment of an antenna capable of alignment with a predetermined azimuth direction, said system comprising: at least one reference target affixed to said antenna; a reference tool operatively coupled to said target; and a first global positioning system receiver dish connected to said reference tool, said first receiver dish being locatable at predetermined first and second positions away from said antenna; wherein said first receiver dish is in communication with a global positioning satellite system for processing positioning data received therefrom when in said predetermined first and second positions to determine an antenna azimuth direction of said antenna and thereby enable alignment of said antenna by moving said antenna with said predetermined azimuth direction.

In a third aspect of the invention, the present invention includes a method of aligning an antenna with a predetermined azimuth direction, said method comprising: in response to processed positioning data received by a first global positioning system receiver dish from a global positioning satellite system, said first receiver dish being connectable to a reference tool alignably connected to said antenna via reference targets, said first receiver dish being locatable at predetermined first and second reference positions away from said antenna, determining a reference azimuth direction of said reference tool and an antenna azimuth direction and moving said antenna from said antenna azimuth direction towards said predetermined azimuth direction so as to align said antenna.

In a fourth aspect of the invention, the present invention includes an antenna alignment system for aligning an antenna with a predetermined azimuth direction, said system comprising: a target means connected to said antenna; a reference tool alignably connected to said target means; and a first global positioning system receiver dish connectable to said reference tool, said first receiver dish being locatable at predetermined first and second reference positions away from said antenna, said first receiver dish being in communication with a global positioning satellite system for processing positioning data received therefrom when in said predetermined first and second positions to determine a reference azimuth direction of said reference tool and an antenna azimuth direction from alignment of said target means enable alignment of said antenna by moving said antenna from said antenna azimuth direction to said predetermined azimuth direction.

In a fifth aspect of the invention, the present invention includes a method of aligning an antenna with a predetermined azimuth direction, said method comprising:

1. providing a first target and a second target, each affixed together upon an antenna;
2. providing a first global positioning (GPS) receiver dish and a second GPS receiver dish, each located remote from said antenna;
3. providing a reference tool connected to said first GPS receiver dish and operably coupled to said first and second reference targets;
4. measuring first and second reference positions via said first and second GPS receiver dishes;
5. determining an azimuth reference angle between said first and second reference positions;
6. calibrating said reference tool with said azimuth reference angle relative to said second GPS receiver dish;
7. measuring positions of said first and second targets relative to said reference tool;
8. determining an azimuth direction of said antenna;
9. comparing said azimuth direction of said antenna with said predetermined azimuth direction;
10. upon said azimuth direction of said antenna being identical to said predetermined azimuth direction, fixing said antenna in position;
11. upon said azimuth direction of said antenna not being identical to said predetermined azimuth direction, rotating said antenna and repeating said steps (9) through (11)

Other objects and advantages of the present invention will become apparent from a careful reading of the detailed description provided herein, with appropriate reference to the accompanying drawings.

BRIEF DESCRIPTION OF THE DRAWINGS

In the annexed drawings, like reference characters indicate like elements throughout.

DETAILED DESCRIPTION OF THE PREFERRED EMBODIMENTS

Figure 1:
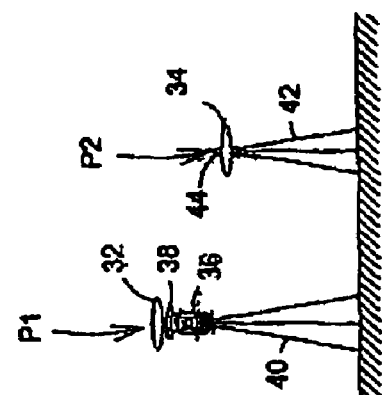
FIG. 1 is a simplified front elevation view of an antenna on a transmission tower in accordance with the antenna alignment system of the present invention.
Figure 1:
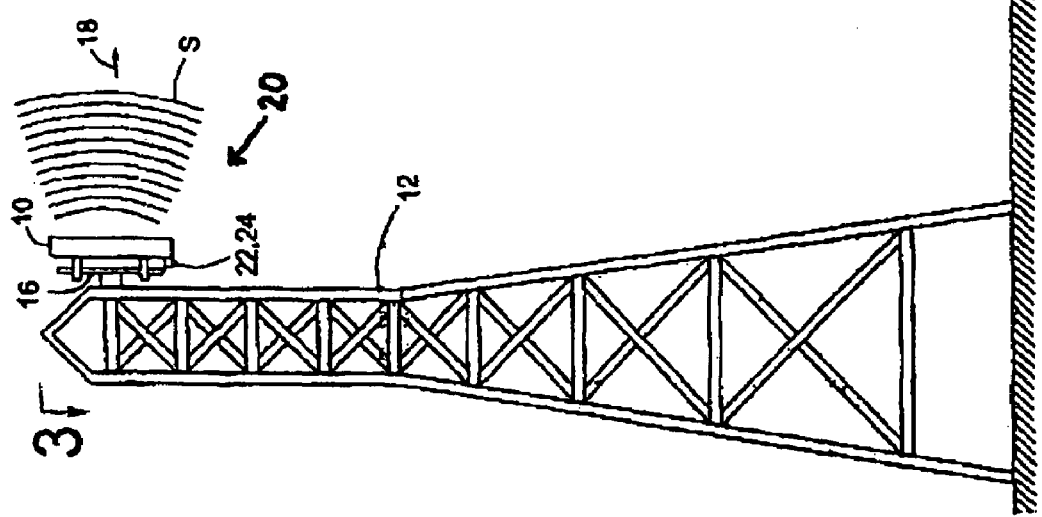

Referring to FIG. 1, there is shown a typical ground telecommunication antenna 10 installed on a high structure such as a building or a transmission tower 12. An antenna alignment system 20 in accordance with a preferred embodiment of the present invention is shown located adjacent the tower 12 on the ground for easy manipulation by an operator (not shown). The antenna 10 is pivotally mounted on the structure 12 about a generally vertical axis 14 of its rotation shaft 16 (see arrow A in FIG. 2) in order to be positionable thereabout to enable the adjustment of its azimuth orientation. Once in proper orientation, the antenna is lockable in place to remain in its adjusted orientation. It should be understood that the present invention could be utilized with any antenna structure so long as the antenna is movable, hinged, or otherwise adjustably mounted.

Figure 2:
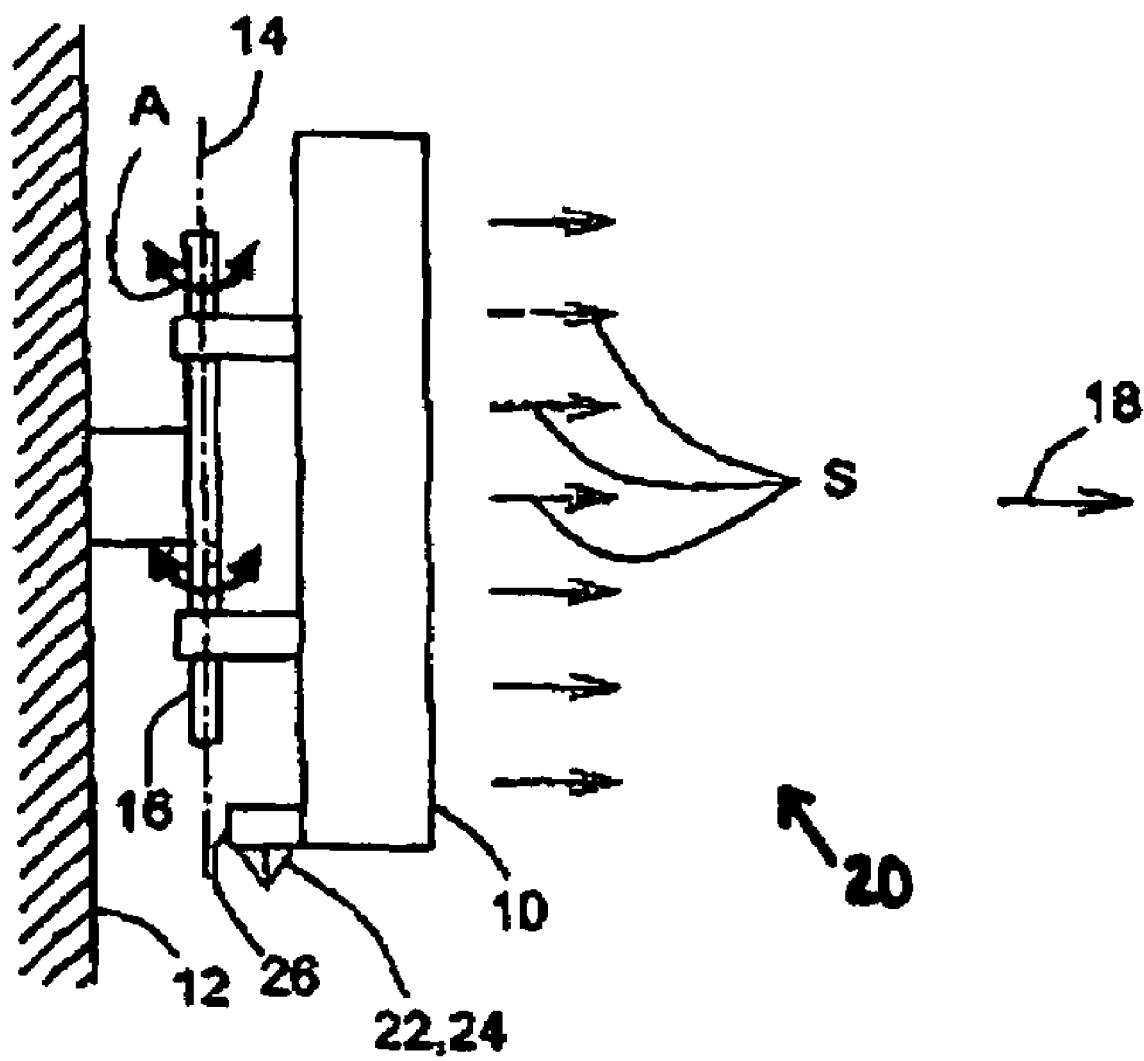
FIG. 2 is a simplified enlarged side elevation view of the antenna of FIG. 1 showing targets mounted on the antenna.

At least one prism target is temporarily and releasably mounted on the antenna 10 using a mounting support 26 (see FIG. 2). Preferably, first 22 and second 24 prism targets are temporarily and releasably mounted on the antenna 10 using a mounting support 26, in a spaced apart relationship relative to one another to the vertical axis 14. The targets may be known types of detectable prisms that may be releasable and can be temporarily attached to an existing antenna for measurements to be made and then quickly disassembled to move to the next antenna. Such targets are well suited for use in conjunction with existing land surveyor equipment. While a separate support with removable prism targets is discussed, it should be understood that the antenna itself could be configured by an original equipment manufacturer to include such targets in a permanently affixed manner. Typically, the two prism targets 22, 24 are spaced by a predetermined target-to-target distance 28 of about three (3) feet in a support direction 30 that is angled relative to the antenna pointing direction 18 of its signal S by an azimuth angle $\theta$ between the support direction 30 and the antenna pointing direction 18 could vary without departing from the scope of the present invention. In an embodiment, only the first prism target 22 can be used. Since it is preferably temporarily and releasably mounted on the antenna 10 using a mounting support 26, the first prism target 22 can be readily moved the target-to-target distance to effectively serve as both prism targets 22 and 24.

The alignment system 20 includes at least one, preferably two GPS satellite system receiver dishes 32, 34. The first receiver dish 32 is preferably releasably mounted on a reference tool 36 via a dish bracket 38. By making the receiver dish releasably mounted, it can be readily moved to effectively serve as both dishes 32 and 34. The reference tool 36 is typically a specialized piece of equipment used by land surveyor such as an electronic theodolite, or a commonly known "total station", used to point at a prism target to determine its distance and geometrical coordinates relative to the reference tool 36. The reference tool 36 is preferably releasably mounted on a first tripod 40, or the like, for ease of use by an operator. The first receiver dish 32 is used to determine the exact terrestrial position, or first reference position P1, of the reference tool 36 by receiving positioning data from a global positioning satellite system. The second receiver dish 34 is preferably releasably mounted on an adjacent second tripod 42 to determine the exact terrestrial position, or second reference position P2, thereof.

The operator or a controller, preferably handheld (not shown) or already existing within the reference tool 36, performs and processes a simple trigonometric calculation using the data related to the positioning of the two dishes 32, 34, using well known GPS technology, Real-Time-Kinematic (RTK) system or the like to preferably automatically determine the reference azimuth direction $\alpha_0$ of the axis extending from the first reference position P1 to the second reference position P2 relative to the geometric North direction N. Preferably, if possible, the two receiver dishes 32, 34 are electrically connected to one another via a controller for improved relative measurement accuracy. The reference azimuth direction $\alpha_0$ is generally entered or saved into the reference tool 36 (located at the first reference position P1) for "orientation-calibration" thereof when pointing, in a back sight, at a calibration reference prism target 44 preferably releasably located on the second tripod 42 at the second reference position P2. It should be readily understood by one skilled in the art that the same first receiver 32 could be used to determine the first and second reference positions P1, P2 by releasably and successively positioning the latter on the two tripods 40, 42.

Typically, the GPS-RTK receiver dishes 32, 34, when connected to each other, are precise enough to provide an azimuth angle accuracy of approximately 0.5 degrees when they are positioned at the two reference positions P1, P2 generally horizontally spaced from one another by a reference position distance 44 of about four feet (4 ft), or 1.2 meters. For applications requiring the reference azimuth angle $\alpha_0$ to be measured with better accuracy, for a high precision antenna alignment, the reference position distance 44 simply needs to be larger.

Figure 3:
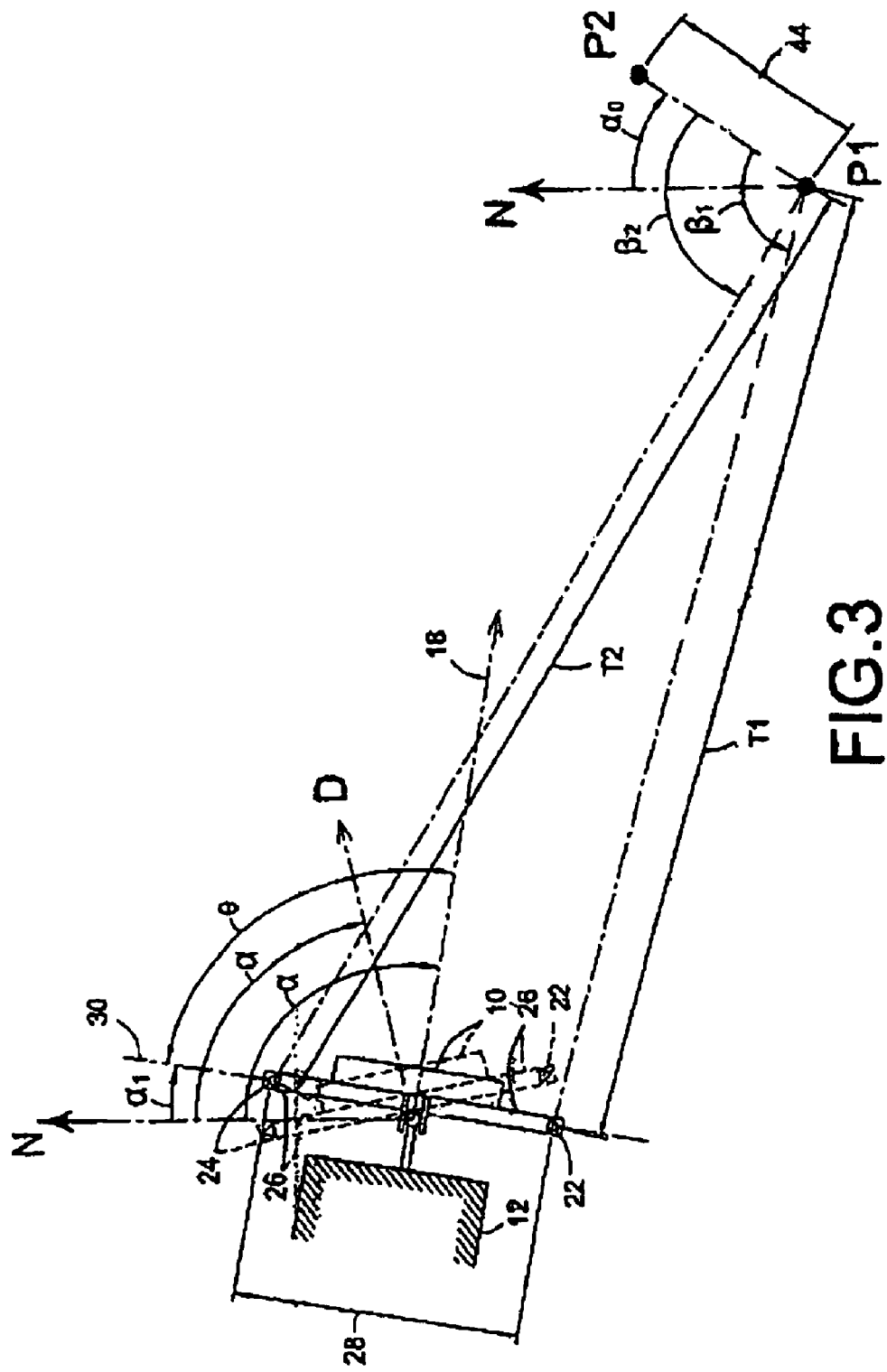
FIG. 3 is a simplified top plan view of FIG. 1, taken along line 3-3, showing an azimuth angle of the antenna being aligned in accordance with the present invention.

As illustrated in FIG. 3, in order to determine the azimuth $\alpha$ of antenna pointing direction 18, the operator uses the calibrated reference tool 36 to successively point at the first and second prism targets 22, 24 to first determine the azimuth $\alpha_1$ of the support direction 30 by measuring the respective first and second target direction angles $\beta_1$, $\beta_2$ thereof relative to the reference azimuth angle $\alpha_0$ and the respective first and second target horizontal distances T1, T2 relative to the reference tool 36. The predetermined target-to-target distance 28 is thereby known to the reference tool 36 because the distance 28 has preferably previously been entered or issued thereinto. The azimuth $\alpha$ of antenna pointing direction 18 is determined from the support azimuth $\alpha_1$ and the azimuth angle $\theta$ (also known to the reference tool 36.

Once the azimuth $\alpha$ of antenna pointing direction 18 is known, an operator rotates the antenna 10 about the rotation shaft 16 by the required offset degrees until the azimuth $\alpha$ of antenna pointing direction 18 matches the desired or predetermined antenna direction azimuth $\alpha'$, with the antenna pointing in the predetermined direction D, as shown in dotted lines in FIG. 3. It should be readily understood that the antenna 10 could be rotated by the proper amount once to be properly oriented or the last step of measurements of first and second target direction angles $\beta_1$, $\beta_2$ and first and second target horizontal distances T1, T2 could be performed a few times until the antenna 10 is properly oriented, based on a trial-and-error fashion. Furthermore, it would be apparent to one skilled in the art that the two prism targets 22, 24 generally need to be in line of sight (visible) from the reference tool 36.

Figure 4:
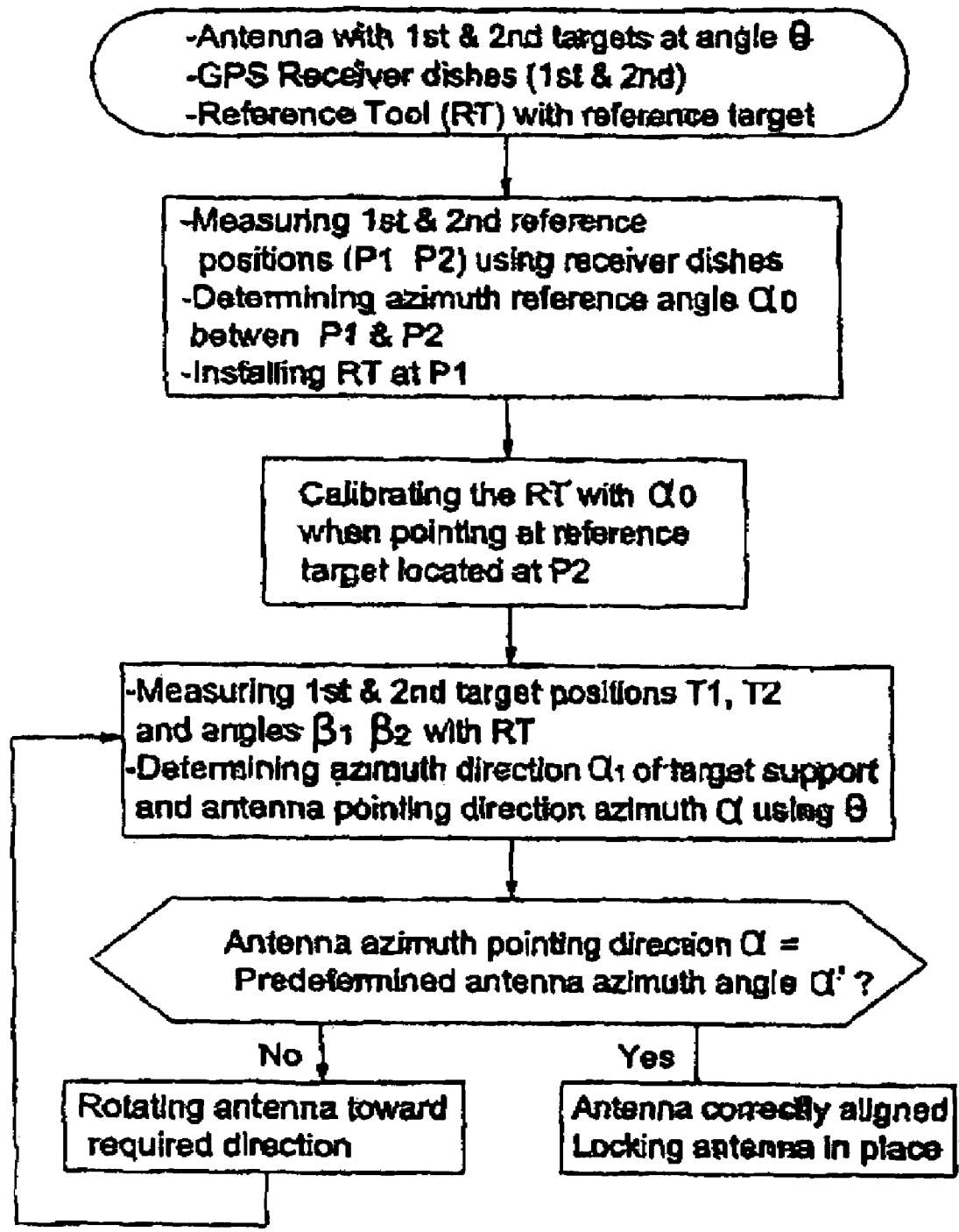
FIG. 4 is a simplified flow diagram of the antenna alignment system and method in accordance with an embodiment of the present invention.

The present invention also relates to a method for aligning an antenna 10. The sequential steps of the method using the antenna alignment system 20 described hereinabove are also schematically illustrated in the flow diagram of FIG. 4.

The first and second receiver dishes 32, 34 are located at reference positions P1, P2, respectively, to measure their geometrical coordinates. Through trigonometric calculations, by hand or using a controller, computer or the like, the reference azimuth angle $\alpha_0$ therebetween is determined, and entered or saved into the reference tool 36 or the like to serve as a geometrical orientation-calibration thereof when being at the first reference position P1 and pointing at a prism target 44 or the like at the second reference position P2. Once the reference tool 36 is orientably calibrated, it preferably automatically enables the determination of the azimuth $\alpha_1$ of the support direction 30 and therefore of the azimuth $\alpha$ of antenna pointing direction 18 by successively measuring first and second target direction angles $\beta_1$, $\beta_2$ and successively measuring first and second target horizontal distances T1, T2, the predetermined target-to-target distance 28 and the azimuth angle $\theta$ being preferably previously known by the reference tool 36. The antenna 10 is then being rotated about its rotational shaft 16 before another antenna alignment assessment is measured again with the system 20. The last step is then repeated until the azimuth $\alpha$ of antenna pointing direction 18 matches the desired or predetermined antenna direction azimuth $\alpha'$ in order to point in the direction D.

When the antenna is properly and correctly aligned in azimuth along the required predetermined azimuth direction $\alpha'$ of direction D, the technician fixes the antenna 10 in place, and typically disassembles the mounting support 26 with the two prism targets 22, 24 therefrom and ultimately proceeds to the next antenna.

While targets of the prism type are described hereinabove, one skilled in the art would understand the other types of targets (mirror targets and the like) and/or radio RF signal emitters or the like could be used in conjunction with the corresponding reference tool without departing from the scope of the present invention. Similarly, it is well within the intended scope of the present invention to use a reference tool that would be simultaneously automatically tracking the two prism targets on a real time basis while the antenna is being rotated in order to provide the real-time antenna pointing direction azimuth $\alpha$.

In summary, a system and method of aligning an antenna with a predetermined azimuth direction are provided. The method includes determining an antenna azimuth direction and moving the antenna from the antenna azimuth direction towards a predetermined azimuth direction so as to align said antenna. This is accomplished in response to processed positioning data received by a global positioning system (GPS) receiver dish from a GPS system where the receiver dish is locatable at predetermined first and second positions away from the antenna. The system includes a reference target affixed to the antenna, a reference tool operatively coupled to the target, and a GPS receiver dish connected to the reference tool. The receiver dish is in communication with a GPS system for processing positioning data received therefrom to determine an antenna azimuth direction of the antenna and thereby enable alignment of said antenna by moving the antenna with a predetermined azimuth direction.

Although the present antenna alignment system and method has been described with a certain degree of particularity, it is to be understood that the disclosure has been made by way of example only and that the present invention is not limited to the features of the embodiments described and illustrated herein. Alterations, modifications and variations may be effected to the particular embodiments by those of skill in the art without departing from the scope of the invention, which is defined solely by the claims appended hereto.

What is claimed is:

1. A method of aligning an antenna with a predetermined azimuth direction, said method comprising:

in response to processed positioning data received by a first global positioning system receiver from a global positioning satellite system where said first receiver is locatable at predetermined first and second positions away from said antenna, (a) determining an antenna azimuth direction of said antenna; and (b) moving said antenna from said antenna azimuth direction towards said predetermined azimuth direction so as to align said antenna.

2. The method according to claim 1, further including the step of processing said positioning data received at said first receiver from said global positioning satellite system, said positioning data including a reference azimuth direction.

3. The method according to claim 2, further including the step of receiving said positioning data at said first receiver from said global positioning satellite system.

4. The method according to claim 3, further including a second global positioning receiver located at said predetermined second position, wherein said first receiver is located at said predetermined first position and said second receiver being in communication with said first receiver.

5. The method according to claim 4, wherein said first receiver is mounted on a reference tool and said second receiver is separate from, and in communication with, said first receiver at a predetermined distance away from said first receiver.

6. The method according to claim 5, wherein at least one reference target is affixed to said antenna for operational coupling with said reference tool.

7. The method according to claim 5, wherein at least two reference targets are affixed to said antenna for operational coupling with said reference tool.

8. The method according to claim 7, wherein a third reference target is located at said predetermined second position for operational coupling with said reference tool.

9. The method according to claim 8, wherein said targets are collectively of a single type and selected from a group consisting of prism targets, mirror targets, and radio frequency emitters.

10. A system for alignment of an antenna capable of alignment with a predetermined azimuth direction, said system comprising:
a reference target affixed to said antenna;
a reference tool operatively coupled to said reference target; and
a first global positioning system receiver connected to said reference tool, said first receiver being locatable at predetermined first and second positions away from said antenna;
wherein said first receiver is in communication with a global positioning satellite system for processing positioning data received therefrom when in said predetermined first and second positions to determine an antenna azimuth direction of said antenna and thereby enable alignment of said antenna by moving said antenna with said predetermined azimuth direction.

11. The system according to claim 10, comprising at least two reference targets affixed to said antenna.

12. The system according to claim 11, further including a second global positioning receiver located at said predetermined second position, wherein said first receiver is mounted on said reference tool and said second receiver is separate from, and in communication, with said first receiver at a predetermined distance away from said first receiver.

13. The system according to claim 12, wherein said targets are collectively of a single type and selected from a group consisting of prism targets, mirror targets, and radio frequency emitters.

14. The system according to claim 13, wherein said first and second receivers are remotely located a predetermined distance away from said targets.

15. The system according to claim 14, wherein a data processor is in communication with said first receiver.

16. A method of aligning an antenna with a predetermined azimuth direction, said method comprising:
in response to processed positioning data received by a first global positioning system receiver from a global positioning satellite system, said first receiver being connectable to a reference tool alignably connected to said antenna via reference targets, said first receiver being locatable at predetermined first and second reference positions away from said antenna,
(a) determining a reference azimuth direction of said reference tool and an antenna azimuth direction and
(b) moving said antenna from said antenna azimuth direction towards said predetermined azimuth direction so as to align said antenna.

17. An antenna alignment system for aligning an antenna with a predetermined azimuth direction, said system comprising:
a target means connected to said antenna;
a reference tool alignably connected to said target means; and
a first global positioning system receiver connectable to said reference tool, said first receiver being locatable at predetermined first and second reference positions away from said antenna, said first receiver being in communication with a global positioning satellite system for processing positioning data received therefrom when in said predetermined first and second positions to determine a reference azimuth direction of said reference tool and an antenna azimuth direction from alignment of said target means enable alignment of said antenna by moving said antenna from said antenna azimuth direction to said predetermined azimuth direction.

18. A method of aligning an antenna with a predetermined azimuth direction, said method comprising:
(a) providing a first target and a second target, each affixed together upon an antenna;
(b) providing a first global positioning (GPS) receiver and a second GPS receiver, each located remote from said antenna;
(c) providing a reference tool connected to said first GPS receiver and operably coupled to said first and second reference targets;
(d) measuring first and second reference positions via said first and second GPS receivers;
(e) determining an azimuth reference angle between said first and second reference positions;
(f) calibrating said reference tool with said azimuth reference angle relative to said second GPS receiver;
(g) measuring positions of said first and second targets relative to said reference tool;
(h) determining an azimuth direction of said antenna;
(i) comparing said azimuth direction of said antenna with said predetermined azimuth direction;
(j) upon said azimuth direction of said antenna being identical to said predetermined azimuth direction, fixing said antenna in position;
(k) upon said azimuth direction of said antenna not being identical to said predetermined azimuth direction, rotating said antenna and repeating said steps (i) through (k).

* * * * *